(12) United States Patent
Chatterjee (10) Patent No.: US 8,305,741 B2
(45) Date of Patent: Nov. 6, 2012

(54) INTERIOR CONNECTOR SCHEME FOR ACCESSORIZING A MOBILE COMPUTING DEVICE WITH A REMOVEABLE HOUSING SEGMENT

(75) Inventor: Manjirnath Chatterjee, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 417 days.

(21) Appl. No.: 12/652,014

(22) Filed: Jan. 4, 2010

(65) Prior Publication Data

US 2010/0172090 A1    Jul. 8, 2010

Related U.S. Application Data

(60) Provisional application No. 61/142,573, filed on Jan. 5, 2009.

(51) Int. Cl.
*G06F 1/16* (2006.01)

(52) U.S. Cl. ......... 361/679.02; 361/679.41; 361/679.58; 455/575.1; 320/108; 320/114

(58) Field of Classification Search .................... 320/108
See application file for complete search history.

(56) References Cited

U.S. PATENT DOCUMENTS

| | | |
|---|---|---|
| 5,375,226 A | 12/1994 | Sano et al. |
| 5,455,466 A | 10/1995 | Parks et al. |
| 5,596,567 A | 1/1997 | de Muro et al. |
| 5,600,225 A | 2/1997 | Goto |
| 5,666,530 A | 9/1997 | Clark et al. |
| 5,733,313 A | 3/1998 | Barreras et al. |
| 5,760,580 A | 6/1998 | Tyren |
| 5,831,348 A | 11/1998 | Nishizawa |
| 5,859,628 A * | 1/1999 | Ross et al. ..................... 345/173 |
| 5,958,051 A | 9/1999 | Renaud et al. |
| 6,006,274 A | 12/1999 | Hawkins et al. |
| 6,062,887 A * | 5/2000 | Schuster et al. .............. 439/218 |
| 6,138,245 A | 10/2000 | Son et al. |
| 6,184,651 B1 | 2/2001 | Fernandez et al. |
| 6,266,539 B1 | 7/2001 | Pardo |
| 6,330,436 B1 | 12/2001 | Zidel |
| 6,389,423 B1 | 5/2002 | Sakakura |
| 6,405,049 B2 | 6/2002 | Herrod et al. |
| 6,436,299 B1 | 8/2002 | Baarman et al. |
| 6,445,936 B1 | 9/2002 | Cannon et al. |

(Continued)

FOREIGN PATENT DOCUMENTS

CN    1592197 A    3/2005

(Continued)

OTHER PUBLICATIONS

Non-Final Office Action mailed Nov. 3, 2010 in U.S. Appl. No. 12/478,616 12 pgs.

(Continued)

*Primary Examiner* — Anthony Q Edwards (57) ABSTRACT

A panel segment is structured to be attachable and detachable from the computing device in order to form a portion of the overall housing for the computing device. The panel segment includes a panel connector, positioned on an interior surface of the panel segment to electrically mate with an interior connector of the computing device when the panel segment is attached. The panel segment includes one or more electrical components that are operable to send an electrical output to, or receive an electrical output from a component of the computing device.

17 Claims, 5 Drawing Sheets

U.S. PATENT DOCUMENTS

| | | | |
|---|---|---|---|
| 6,456,039 B1* | 9/2002 | Lauper et al. | 320/107 |
| 6,501,364 B1 | 12/2002 | Hui et al. | |
| 6,510,424 B1 | 1/2003 | Ford et al. | |
| 6,532,152 B1 | 3/2003 | White et al. | |
| 6,630,811 B1* | 10/2003 | Gioscia | 320/107 |
| 6,673,250 B2 | 1/2004 | Kuennen et al. | |
| 6,731,071 B2 | 5/2004 | Baarman | |
| 6,751,486 B1* | 6/2004 | Guillot et al. | 455/573 |
| 6,795,110 B1 | 9/2004 | Kossin | |
| 6,803,744 B1 | 10/2004 | Sabo | |
| 6,806,649 B2 | 10/2004 | Mollema et al. | |
| 6,810,405 B1 | 10/2004 | LaRue et al. | |
| 6,812,645 B2 | 11/2004 | Baarman | |
| 6,825,620 B2 | 11/2004 | Kuennen et al. | |
| 6,831,417 B2 | 12/2004 | Baarman | |
| 6,842,335 B1* | 1/2005 | Hanson et al. | 361/679.3 |
| 6,859,650 B1 | 2/2005 | Ritter | |
| 6,888,438 B2 | 5/2005 | Hui et al. | |
| 6,917,163 B2 | 7/2005 | Baarman | |
| 6,975,198 B2 | 12/2005 | Baarman et al. | |
| 6,986,051 B2 | 1/2006 | Le Pennec et al. | |
| 7,050,044 B2* | 5/2006 | Liu | 345/169 |
| 7,065,658 B1 | 6/2006 | Baraban et al. | |
| 7,116,200 B2 | 10/2006 | Baarman et al. | |
| 7,118,240 B2 | 10/2006 | Baarman et al. | |
| 7,126,450 B2 | 10/2006 | Baarman et al. | |
| 7,132,918 B2 | 11/2006 | Baarman et al. | |
| 7,149,473 B1 | 12/2006 | Lindlar et al. | |
| 7,164,255 B2 | 1/2007 | Hui | |
| 7,215,924 B2* | 5/2007 | Palermo et al. | 455/41.1 |
| 7,248,017 B2 | 7/2007 | Cheng et al. | |
| 7,262,700 B2 | 8/2007 | Hsu | |
| 7,271,569 B2 | 9/2007 | Oglesbee | |
| 7,286,880 B2 | 10/2007 | Olson et al. | |
| 7,313,422 B2* | 12/2007 | White et al. | 455/575.1 |
| 7,331,793 B2 | 2/2008 | Hernandez et al. | |
| 7,375,492 B2 | 5/2008 | Calhoon et al. | |
| 7,382,636 B2 | 6/2008 | Baarman et al. | |
| 7,385,357 B2 | 6/2008 | Kuennen et al. | |
| 7,392,059 B2 | 6/2008 | White et al. | |
| 7,414,380 B2 | 8/2008 | Tang et al. | |
| 7,446,672 B2 | 11/2008 | Johnson et al. | |
| 7,454,170 B2 | 11/2008 | Goossens et al. | |
| 7,462,951 B1 | 12/2008 | Baarman | |
| 7,471,986 B2 | 12/2008 | Hatlestad | |
| 7,495,414 B2* | 2/2009 | Hui | 320/108 |
| 7,521,890 B2 | 4/2009 | Lee et al. | |
| 7,551,429 B1* | 6/2009 | Hanson et al. | 361/679.56 |
| 7,576,514 B2* | 8/2009 | Hui | 320/108 |
| 7,743,151 B2 | 6/2010 | Vallapureddy et al. | |
| 7,831,218 B2* | 11/2010 | Wulff et al. | 455/90.3 |
| 7,920,377 B2* | 4/2011 | Kaply et al. | 361/679.4 |
| 7,974,080 B2* | 7/2011 | Harris | 361/679.02 |
| 8,143,850 B2* | 3/2012 | Erickson | 320/115 |
| 8,165,965 B2 | 4/2012 | Ritter | |
| 2002/0082042 A1* | 6/2002 | Mark et al. | 455/550 |
| 2002/0084698 A1 | 7/2002 | Kelly et al. | |
| 2002/0103008 A1 | 8/2002 | Rahn et al. | |
| 2003/0214255 A1 | 11/2003 | Baarman et al. | |
| 2003/0233455 A1 | 12/2003 | Leber et al. | |
| 2004/0088012 A1 | 5/2004 | Kroll et al. | |
| 2004/0130915 A1 | 7/2004 | Baarman | |
| 2004/0130916 A1 | 7/2004 | Baarman | |
| 2004/0150934 A1 | 8/2004 | Baarman | |
| 2004/0199474 A1 | 10/2004 | Ritter | |
| 2004/0222751 A1 | 11/2004 | Mollema et al. | |
| 2004/0232845 A1 | 11/2004 | Baarman et al. | |
| 2004/0259499 A1 | 12/2004 | Oba et al. | |
| 2005/0007067 A1 | 1/2005 | Baarman et al. | |
| 2005/0093475 A1 | 5/2005 | Kuennen et al. | |
| 2005/0116650 A1 | 6/2005 | Baarman | |
| 2005/0122058 A1 | 6/2005 | Baarman et al. | |
| 2005/0122059 A1 | 6/2005 | Baarman et al. | |
| 2005/0127849 A1 | 6/2005 | Baarman et al. | |
| 2005/0127850 A1 | 6/2005 | Baarman et al. | |
| 2005/0162824 A1* | 7/2005 | Thompson | 361/686 |
| 2006/0030377 A1* | 2/2006 | White et al. | 455/575.1 |
| 2006/0041420 A1 | 2/2006 | Martin et al. | |
| 2006/0061958 A1 | 3/2006 | Solomon et al. | |
| 2006/0123055 A1 | 6/2006 | Atkinson et al. | |
| 2006/0132045 A1 | 6/2006 | Baarman | |
| 2007/0035917 A1 | 2/2007 | Hotelling et al. | |
| 2007/0064406 A1 | 3/2007 | Beart | |
| 2007/0120752 A1 | 5/2007 | Takasu | |
| 2007/0133156 A1* | 6/2007 | Ligtenberg et al. | 361/681 |
| 2007/0182367 A1 | 8/2007 | Partovi | |
| 2007/0188284 A1 | 8/2007 | Dobbs | |
| 2007/0246546 A1 | 10/2007 | Yoshida | |
| 2007/0290654 A1 | 12/2007 | Govari et al. | |
| 2008/0133918 A1 | 6/2008 | You et al. | |
| 2008/0196086 A1 | 8/2008 | Shintani et al. | |
| 2008/0231537 A1 | 9/2008 | Rofougaran et al. | |
| 2008/0278894 A1 | 11/2008 | Chen et al. | |
| 2008/0278899 A1* | 11/2008 | Hotelling et al. | 361/683 |
| 2009/0001941 A1 | 1/2009 | Hsu et al. | |
| 2009/0008148 A1 | 1/2009 | Mashino | |
| 2009/0069869 A1 | 3/2009 | Stouffer et al. | |
| 2009/0088077 A1 | 4/2009 | Brown et al. | |
| 2009/0106567 A1 | 4/2009 | Baarman | |
| 2009/0170433 A1 | 7/2009 | Rhodes et al. | |
| 2009/0212637 A1 | 8/2009 | Baarman et al. | |
| 2009/0212737 A1 | 8/2009 | Johnson et al. | |
| 2010/0007449 A1 | 1/2010 | Tait et al. | |
| 2010/0021176 A1 | 1/2010 | Holcombe et al. | |
| 2010/0045269 A1 | 2/2010 | LaFranchise et al. | |
| 2010/0070219 A1 | 3/2010 | Azancot et al. | |
| 2010/0076524 A1 | 3/2010 | Forsberg et al. | |
| 2010/0081377 A1 | 4/2010 | Corbridge et al. | |
| 2010/0081473 A1 | 4/2010 | Chatterjee et al. | |
| 2010/0081483 A1 | 4/2010 | Chatterjee et al. | |
| 2010/0083012 A1 | 4/2010 | Corbridge et al. | |
| 2010/0121965 A1 | 5/2010 | Chatterjee | |
| 2010/0131691 A1 | 5/2010 | Chatterjee et al. | |
| 2010/0146308 A1 | 6/2010 | Gioscia et al. | |
| 2010/0156193 A1 | 6/2010 | Rhodes et al. | |
| 2010/0157524 A1* | 6/2010 | Soffer | 361/679.58 |
| 2010/0177476 A1 | 7/2010 | Hotelling et al. | |
| 2010/0194336 A1 | 8/2010 | Azancot et al. | |
| 2011/0090626 A1* | 4/2011 | Hoellwarth et al. | 361/679.01 |

FOREIGN PATENT DOCUMENTS

| | | |
|---|---|---|
| EP | 395469 A2 | 10/1990 |
| FR | 2601161 A1 | 1/1988 |
| GB | 2389720 B | 9/2005 |
| GB | 2399466 B | 11/2005 |
| GB | 2389767 B | 4/2006 |
| JP | 09-259241 A | 10/1997 |
| JP | 11-354348 A | 12/1999 |
| JP | 3161388 B2 | 2/2001 |
| KR | 10-0836634 B1 | 6/2008 |
| WO | WO 95/03686 A1 | 2/1995 |
| WO | WO 2005/024865 A2 | 3/1995 |
| WO | WO 2004/098079 A1 | 11/2004 |
| WO | WO 2008/033670 A2 | 3/2008 |
| WO | WO 2008/044875 A1 | 4/2008 |
| WO | WO 2008/133806 A1 | 11/2008 |
| WO | WO 2009/057771 A1 | 5/2009 |
| WO | WO 2010/005324 A1 | 1/2010 |
| WO | WO 2010/062198 A1 | 6/2010 |
| WO | WO 2010/068062 A2 | 6/2010 |
| WO | WO 2010/068062 A3 | 7/2010 |
| WO | WO 2010/091269 A1 | 8/2010 |

OTHER PUBLICATIONS

U.S. Appl. No. 12/916,388, filed Oct. 29, 2010, Chatterjee et al.
U.S. Appl. No. 12/975,335, filed Dec. 21, 2010, Oh et al.
U.S. Appl. No. 12/987,940, filed Jan. 10, 2011, Chatterjee et al.
U.S. Appl. No. 29/323,686, filed Aug. 28, 2008, Matsuoka et al.
U.S. Appl. No. 12/628,401, filed Dec. 1, 2009, Chaterjee.
U.S. Appl. No. 12/840,241, filed Jul. 20, 2010, Chatterjee.
U.S. Appl. No. 12/841,001, filed Jul. 21, 2010, Chatterjee.
International Search Report and Written Opinion dated Aug. 20, 2010 in International Application No. PCT/US2009/069847.
International Search Report and Written Opinion dated Jul. 28, 2010 in International Application No. PCT/US2009/068332.

International Search Report and Written Opinion dated Jul. 21, 2010 in International Application No. PCT/US2009/068328.

International Search Report and Written Opinion dated Apr. 20, 2010 in International Application No. PCT/US2009/055928.

U.S. Appl. No. 11/430,786, filed May 8, 2006, Baraban et al.

U.S. Appl. No. 29/323,688, filed Aug. 28, 2008, Matsuoka.

Final Office Action mailed Jul. 9, 2007 in U.S. Appl. No. 11/430,786.

Final Office Action mailed Jul. 19, 2010 in U.S. Appl. No. 11/430,786.

Final Office Action mailed Oct. 25, 2004 in U.S. Appl. No. 09/861,658 10 pgs.

Final Office Action mailed Dec. 30, 2009 in U.S. Appl. No. 11/430,786.

Final Office Action mailed Jan. 8, 2009 in U.S. Appl. No. 11/430,786.

Hui et al., "A New Generation of Universal Contactless Battery Charging Platform for Portable Consumer Electronic Equipment," IEEE Trans Power Electronics, 20(3):620-627 (2005).

International Search Report and Writen Opinion dated Aug. 31, 2010 in International Application No. PCT/US2010/020054.

Kean, Steven, "Powermat Portable Wireless Charging Mat", pp. 1-12 dwnloaded from http://www.bigbruin.com/content/powermat_1 on Sep. 29, 2010.

Liang et al., "An implantable bi-directional wireless transmission system for transcutaneous biological signal recording," Physiol. Meas. 26:83-97 (2005).

Mel B. W. et al., "Tablet: Personal Computer in the Year 2000", Communications of the Association for Computing machinery, New Your, NY vol. 31, No. 6, Jun. 1, 1988, 639-646 XP000047633ISSN: 0001-0782.

Non-Final Office Action mailed Mar. 24, 2010 in U.S. Appl. No. 11/430,786.

Non-Final Office Action mailed Jun. 11, 2009 in U.S. Appl. No. 11/430,786.

Non-Final Office Action mailed Jan. 25, 2008 in U.S. Appl. No. 11/430,786.

Non-Final Office Action mailed Sep. 30, 2010 in U.S. Appl. No. 11/430,786 7 pgs.

Non-Final Office Action mailed Oct. 5, 2006 in U.S. Appl. No. 11/430,786.

Non-Final Office Action mailed Apr. 22, 2004 in U.S. Appl. No. 09/861,658 7 pgs.

Non-Final Office Action mailed Apr. 7, 2005 in U.S. Appl. No. 09/861,658 11 pgs.

Non-Final Office Action mailed Jul. 25, 2008 in U.S. Appl. No. 11/430,786.

Notice of Allowance mailed Jan. 9, 2006 in U.S. Appl. No. 09/861,658 12 pgs.

Opticon Users manual DWT 7133, Nov. 2000.

International Preliminary Report on Patentability and Written Opinion, dated Jul. 5, 2011, in International Application No. PCT/U2010/020054.

International Search Report dated Aug. 31, 2010 in International Application No. PCT/US2010/020054.

* cited by examiner

INTERIOR CONNECTOR SCHEME FOR ACCESSORIZING A MOBILE COMPUTING DEVICE WITH A REMOVEABLE HOUSING SEGMENT

RELATED APPLICATIONS

This application claims benefit of priority to Provisional U.S. Patent Application No. 61/142,573, entitled INTERNAL BUS CONNECTOR, and filed Jan. 5, 2009; the aforementioned priority application being hereby incorporated by reference in its entirety.

TECHNICAL FIELD

The disclosed embodiments relate to a mobile computing device. In particular, the disclosed embodiments pertain to an interior connector scheme for accessorizing a mobile computing device with a removeable housing segment.

BACKGROUND

Connectors are heavily used with computing devices in order to enable computing devices to communicate power and data. Mobile computing devices have traditionally used exterior connectors or connector slots (e.g. for Secure Digital cards). Among other drawbacks, the traditional connectors require 'real estate' on the housing to accommodate the dimensions of the connector or slot.

DETAILED DESCRIPTION

Embodiments described herein include a panel segment for a computing device. The panel segment may be structured to be attachable and detachable from the computing device in order to form a portion of the overall housing for the computing device. The panel segment includes a panel connector, positioned on an interior surface of the panel segment to electrically mate with an interior connector of the computing device when the panel segment is attached to the computing device. The panel segment includes one or more electrical components that are operable to send an electrical output to, or receive an electrical output from a component of the computing device.

In some embodiments, the panel connector and device connector form a bi-directional connector for exchanging power between the two devices.

Figure 1:
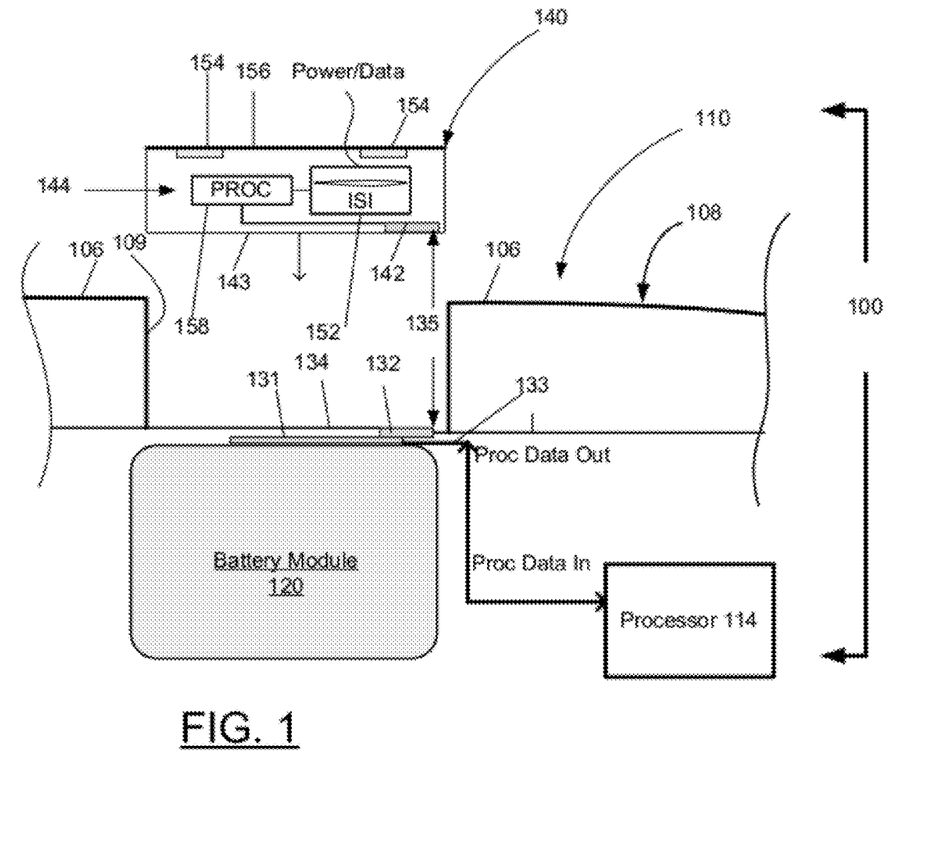
FIG. 1 illustrates a computing device assembly, in accordance with one or more embodiments.

FIG. 1 illustrates a computing device assembly, in accordance with one or more embodiments. A computing device assembly 100 includes a computing device 110 that can be selectively combined with a functional or accessorial panel segment 140. In FIG. 1, a portion of a device housing 108 is shown as receiving the panel segment 140. The panel segment 140 and housing 108 are structured so that the panel segment 140 can attach and de-attach from the housing 108 by user operation, so as to be a removable segment of the housing. For example, clasps or other mechanical mechanisms may be used to enable the panel segment 140 to be detachable and attachable from housing 108. When attached, the panel segment 140 becomes an integrated element of the housing 108. The panel segment occupies an opening 109 in the shell of the housing 108, so that the exterior surface 156 of the panel segment 140 is flush against an adjoining exterior surface 106 of the computing device housing 108. In some embodiments, the panel segment 140 overlays a battery module 120 of the computing device, so as to form a battery cover or door. However, the panel segment 140 may be provided on any part of the device. In variations, the panel segment 140 forms a portion of the housing that is apart or separate from the battery cover (or does not overlay the device battery). In some embodiments, the panel segment 140 may form a housing structure on the front, back or side of the device. Such a housing structure may be implemented as an integrated or visually seamless portion of the overall device housing.

In FIG. 1, the computing device 110 is depicted as a mobile computing device, which may correspond to any device that includes roaming wireless network and/or telephony capabilities, including cellular telephony devices and/or mobile messengers. In particular, embodiments described herein may apply to numerous kinds of mobile or small form-factor computing devices. One type of mobile computing device that may be configured to include embodiments described herein include a computer telephony device, such as a cellular phone or mobile device with voice-telephony applications (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Mobile computing devices in particular may have numerous types of input mechanisms and user-interface features, such as keyboards or keypads, multi-directional or navigation buttons, application or action buttons, and contact or touch-sensitive display screens. Some devices may include combinations of keyboard, button panel area, and display screen (which may optionally be contact-sensitive) on one fagade. The button panel region may occupy a band between the keypad and the display area, and include a navigation button and multiple application buttons or action buttons. Specific types of messaging that may be performed includes messaging for email applications, Short Message Service (SMS) messages, Multimedia Message Service (MMS) messages, and proprietary voice exchange applications (such as SKYPE). Still further, other types of computing device contemplated with embodiments described herein include laptop or notebook computers, ultra-mobile computers, personal digital assistants, and other multi-functional computing devices.

According to embodiments, the panel segment 140 is functionalized with one or more electrical components to extend or enhance functionality of the computing device 110. The panel segment 140 extends the functionality of the computing device 110 using a connector interface that is shared with the computing device 110. More specifically, the panel segment 140 includes a panel connector 142 that is positioned on an interior surface 143 of the panel segment 140. In this position, the panel connector 142 is not accessible when the panel segment is coupled or integrated with the housing 108 of the computing device 100. The panel connector 142 includes one or more electrical contacts for sending or receiving power and/or data. The panel connector 142 extends a data and/or power bus to other components, such as processor 158. The computing device 110 includes an interior connector 132, provided on an interior surface 134. The interior connector 132 may extend to a data bus 133 or power bus 131. The data bus may extend to a processor 114 of the computing device 110, or to control logic distributed to, for example, control power input or output from the battery module 120. The power bus 131 may extend to the battery module 120, or to other components that draw and use power. The interior device connector 132 and the panel connector 142 are each positioned so as to mate and form an electrical connection 135 when the panel segment 110 is joined to the housing 108 of the computing device 110. When mated, the panel segment 140 and computing device 110 exchange power and/or data for various applications and implementations.

In one embodiment, the panel segment provides an inductive signal interface 152 to enable power and/or data to be inductively between the computing device 110 and a third device (e.g. inductively enabled docking station). More specifically, the inductive signal interface 152 of the panel segment 140 inductively couples to a docking station (see FIG. 5) or to another device (see FIG. 6) to either send or receive power across an inductive link. In receiving power from a third device (i.e. not the computing device 110), the inductive signal interface 152 conditions and treats the power, and signals the incoming power to the device 110 over the bus 133. The incoming power can be used to recharge battery module 120, or supply power to components of the device directly. In transmitting power to the third device, the inductive signal interface 152 enables power provided from the battery module 120 to be communicated to a third device, such as another computing device (see FIG. 6). In an inductive docking environment, some implementations provide that the panel segment 140 includes tabs 154 formed from magnetically attractive material, such as ferrous tabs, to enable the assembly 100 to magnetically couple and uncouple with a docking station. Numerous other applications or implementations are possible to provide alternative functionality with the panel segment 140. Some of the alternative functionality is shown and described with FIG. 7A through FIG. 7E. As described elsewhere, alternative variations provide for the panel segment to provide other functionality, or even act as a pass through for a power or data signal.

FIG. 2A through FIG. 2D illustrates various connectivity schemes when including or attaching the panel segment 140 to the computing device 110. Reference is made to FIG. 1 and each of FIG. 2A through FIG. 2D in describing the various connectivity schemes.

Figure 2A:
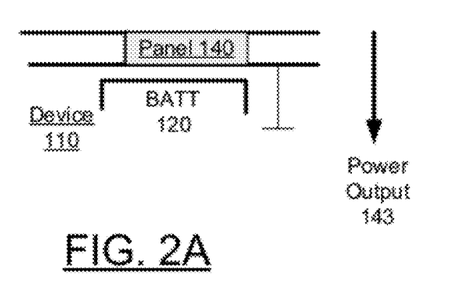
FIG. 2A illustrates an embodiment in which a panel segment operates to supply power to a connected computing device.

FIG. 2A illustrates an embodiment in which the panel segment 140 operates to supply power to the computing device 110. As described with some embodiments, for example, the panel segment 140 may be configured to inductively receive power from another device (e.g. docking station), and then generate the power output 143 from the power reception. Alternatively, the panel segment 140 carries a solar cell, auxiliary power unit, or has an interface to another device from which it receives power. The power output 143 can be sufficient to charge the battery component 120 of the device and/or to power the device 110. The power output 143 is communicated to the computing device 110, where a power bus 131 (FIG. 1) uses the incoming power to charge the battery module 120 and/or operate other components of the computing device. As an alternative, the panel segment 140 includes its own power source (e.g. solar panel), or is able to receive power from another device via another connector interface.

Figure 2B:
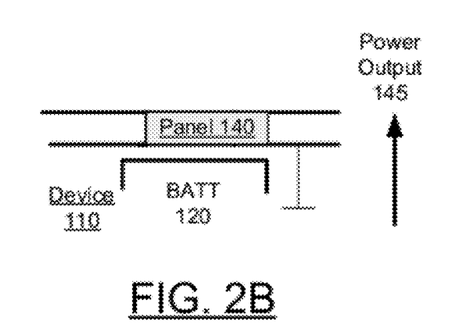
FIG. 2B illustrates an embodiment in which the panel segment operates to receive power from the computing device.

FIG. 2B illustrates an embodiment in which the panel segment 140 operates to receive power from the computing device 110. As shown, the panel segment 140 receives a power output 145 from the computing device 110. For example, the computing device 110 may communicate power output 145 across the power buss 131 to the panel segment 140. In an inductive signaling application, the panel segment 140 uses the inductive signal interface 152 (FIG. 1) to signal power out to operate or charge a third device (see FIG. 6). As an alternative or addition, the panel segment 140 uses the power output 145 to operate internal components that perform some function (e.g. provide a display).

Figure 2C:
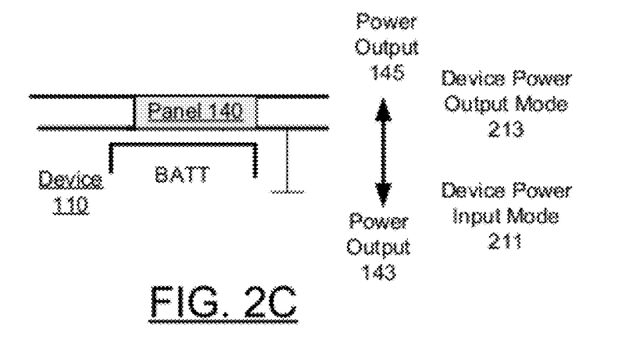
FIG. 2C illustrates an embodiment in which power signal exchange across the electrical connection is bi-directional.

FIG. 2C illustrates an embodiment in which power signal exchange across the electrical connection 135 (FIG. 1) is bi-directional. In such an embodiment, the computing device assembly 100 is operable in either modes that correspond to (i) a device power input mode 211, in which the device 110 receives the power output 143 from the panel segment 140; or (ii) a device power output mode 213, in which the device 110 sends the power output 145 to the panel segment 140.

Figure 2D:
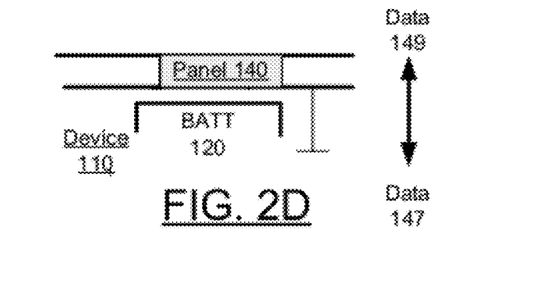
FIG. 2D illustrates an embodiment in which the panel segment and the computing device signal data to one another.

FIG. 2D illustrates an embodiment in which the panel segment 140 and the computing device 110 signal data. The exchange of data may be implemented as an alternative or addition to schemes that exchanging power (as described with FIG. 2A through FIG. 2C). The panel segment 140 and computing device 110 may communicate data using the electrical connection 135 formed by the panel connector 142 (FIG. 1) and the device connector 132 (FIG. 1). The panel segment 140 communicates data 147 to the device 110, either in connection with a power output, or as a separate function. Likewise, the device 110 may communicate the data 149 to the panel segment 140, either with or without a power output being communicated between the two devices. In an implementation, for example, in which inductive signal interface 152 is used to inductively receive power from another device, the panel segment 140 sends power output 143 to the device 110, and the device 110 communicates the data 149 to communicate information about the power requirements of the device 100 (FIG. 1) or the battery module 120.

Figure 3A:
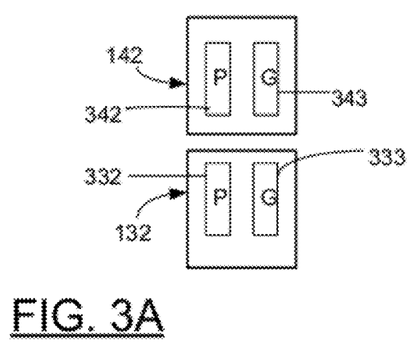
FIG. 3A and FIG. 3B illustrate different element ('pin') configurations for a panel connector and a device connector, according to embodiments.
Figure 3B:
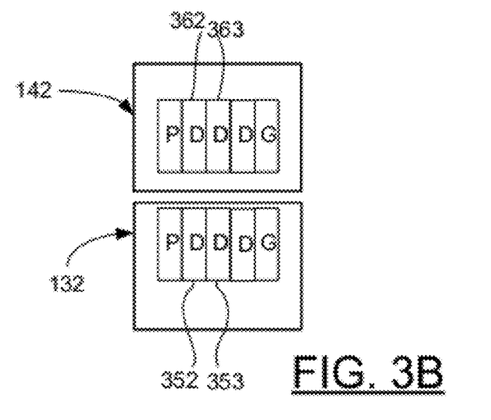

FIG. 3A and FIG. 3B illustrate different element ('pin') configurations for the panel connector 142 and the device connector 132. The pin configuration may be designed to accommodate the functionality that is to be provided from the panel segment 140 (FIG. 1). In an embodiment shown by FIG. 3A, in which only power is to be exchanged between the panel segment 140 and the computing device 110, the pin configuration may include a respective pin 332, 342 for power and a pin for ground 333, 343. Additional pins may be used in an embodiment shown by FIG. 3B, in which power and data is to be exchanged. In the implementation show, up to three data pins 352, 353 and 362, 363 on each respective connector 132, 142 carry data, although more of fewer pins may be used. The pin configuration may provide a serial bus between the panel segment 140 and the device 110 (FIG. 1). In some implementations, the pin configuration may follow a standard, such as one promulgated by the Universal Serial Bus (USB) standard, at least to the extend of the pin configuration. Other bus/connector standards and configurations may alternatively be used, such as, for example, I2C (Intelligent Interface Controller), SPI (Serial Peripheral Interface), one-wire, I2S (Integrated Interchip Sound) and SMB (System Management Bus).

Embodiments such as described by FIG. 3A and FIG. 3B illustrate a passive electrical connector system, in which the device connector 132 and the panel connector 142 are passively maintained against one another when the panel segment 140 is attached. In some variations, an active connector system may use mechanical attachment mechanisms or other securements at the location of the individual connectors 132, 142 to actively maintain the two connectors in contact when the panel segment is attached.

Figure 4A:
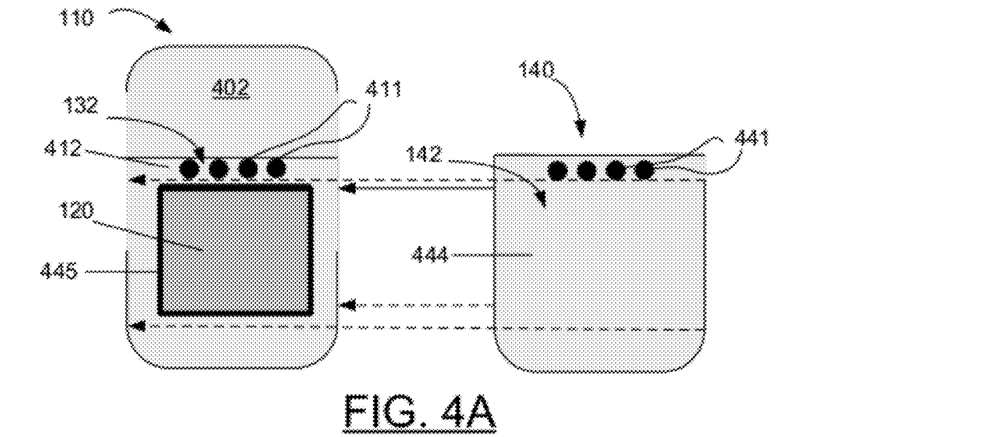
FIG. 4A and FIG. 4B illustrate a housing configuration for each of the computing device and the panel segment, according to an embodiment.
Figure 4B:
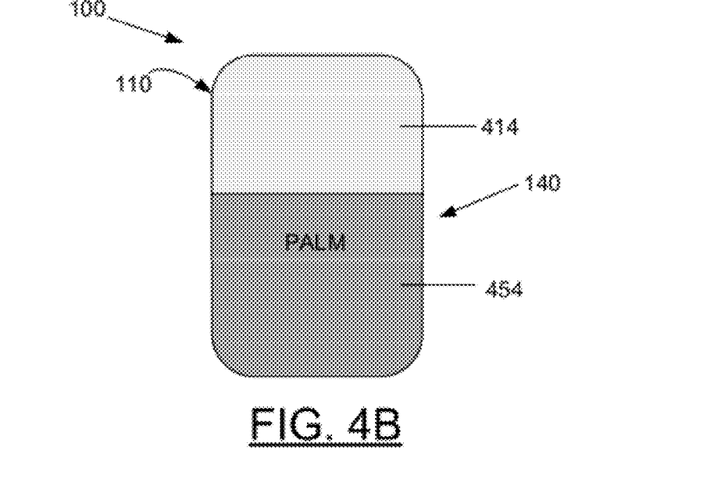

FIG. 4A and FIG. 4B illustrate a configuration for each of the computing device 110 and the panel segment 140, according to an embodiment. Computing device 110 includes a back façade 402 that has the removable panel segment 140 or cover for battery module 120. The panel segment 140 can be dimensioned to occupy only a portion of the total length and/or width dimension of the device 110. An interior surface 412 of the device 110 includes the device connector 132. As shown, the device connector 132 includes four pins 411, although more or fewer may be used. The battery module 120 is maintained in a recess 445 that is formed adjacent to the interior surface. In some implementations, spacing is provided between individual pins to provide electrical insulation and reduce cross-walk.

FIG. 4A further illustrates that the panels segment 140 includes an interior surface 444 on which the panel connector 142 is provided. The panel connector 440 includes four pins 441 to match the configuration of the device connector 132. The panel connector 142 and the device connector 132 are positioned so that when the panel segment 140 is attached, the two connectors are aligned to make electrical contact. When attach, the panel segment 140 covers the battery module 120, so as to form a battery cover for the device.

FIG. 4B illustrates the panel segment 140 attached to the device 110. An exterior surface 454 of the panel segment 140 forms a portion of the overall exterior façade of the assembly 100. Each of the panel segment 140 and the device 110 can be constructed so that the exterior surface 414 of the device 110 transitions smoothly into the exterior surface 454 of the panel segment 140.

Usage Applications

Figure 5:
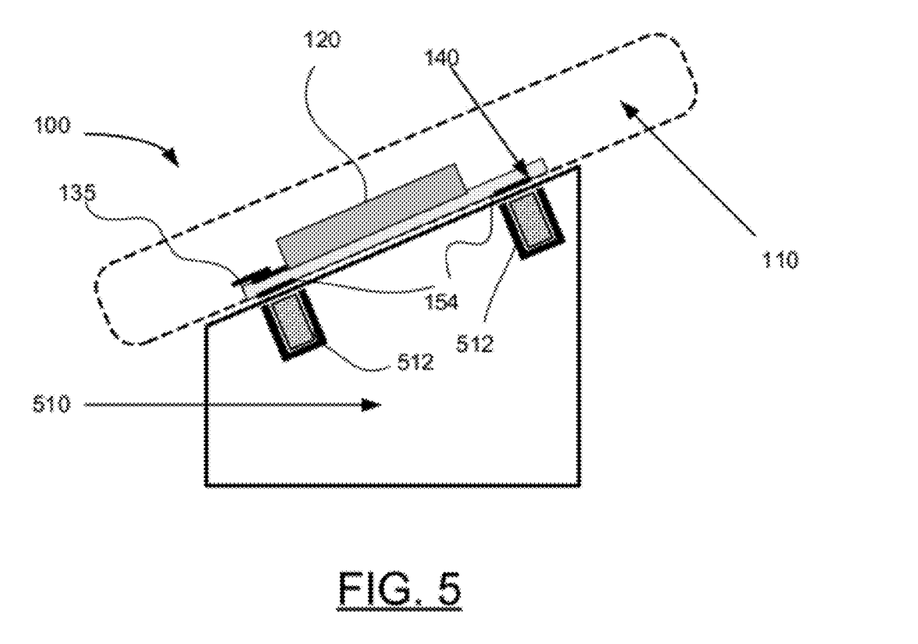
FIG. 5 illustrates a computing device and a panel segment that combine to inductively connect to a docking station, under an embodiment.

As described with some embodiments, the panel segment 140 ma be combined with the computing device 110 in order to extend functionality for enabling the inductive transfer of power and/or data with another device. In FIG. 5, the computing device 110 and panel segment 140 are connected to form the assembly 100. The assembly 100 is inductively connected to a docking station 510 in order to receive power from the docking station. In one implementation, the panel segment 140 includes the tabs 154 to enable the assembly 100 as a whole to magnetically couple to the docking station 510 (or some other device) that uses aligned 520 magnets. Thus, the panel segment 140 may extend the ability of the device 110 to connect to magnets, by including tabs 154 formed from magnetically attractive material (e.g. formed from ferrous material).

The inductive signal interface 152 (see FIG. 1) of the computing device 100 interfaces with the docking station 510 in order to receive the power signal. Circuits and other components of the panel segment 140 treat the incoming power signal, and communicate the power to the device 110 using the electrical connection 135 formed by the respective panel connector 142 (FIG. 1) and device connector 132 (FIG. 1). Thus, an embodiment shown by FIG. 5 may be implemented in order for the device to receive power using the electrical connection 135 (as described with FIG. 2A). The power may be used to recharge the battery module 120, or to directly power components of the device 110. As an additional variation, the computing device 110 may use the electrical connection 135 to communicate data to the panel segment 140 (as described with FIG. 2D). The data may signify, for example, the power usage needs of the device 110. The power usage needs may reflect, for example, the battery level or load usage of the computing device.

Figure 6:
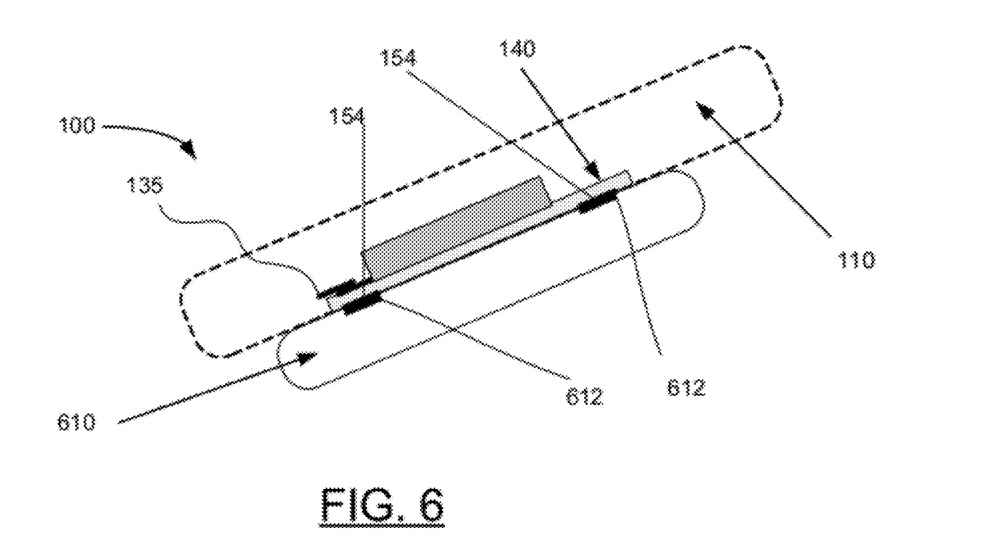
FIG. 6 illustrates a computing device and a panel segment that combine to inductively connect to another computer, under an embodiment.

FIG. 6 illustrates the computing assembly 100 mated to another computing device 610 in order to supply the other computing device with power. As with an implementation of FIG. 5, the tabs 154 of the panel segment 140 may extend magnetic coupling functionality to the computing device 110, so as to enable the assembly 100 to magnetically couple with magnets 612 of the other device 610. The device 110 and the panel segment 140 may be operated in separate modes correspond to (i) device power output mode (as shown by FIG. 6), in which the device 110 signals power to the panel segment 140, for conveyance to the second device 610; and (ii) device power input mode (as shown by FIG. 5), in which the panel segment 140 receives power from the docking station 510 (FIG. 5) and conveys the power to the device 110 using the internal connectors.

U.S. patent application Ser. No. 12/478,766, entitled INDUCTIVE SIGNAL TRANSFER SYSTEM FOR COMPUTING DEVICES, filed Jun. 4, 2009; is hereby incorporated by references, and discloses an inductive signal interface for use on a computing device such as described with FIG. 5 and FIG. 6, and elsewhere in this application. U.S. patent application Ser. No. 12/239,656, entitled ORIENTATION AND PRESENCE DETECTION FOR USE IN CONFIGURING OPERATIONS OF COMPUTING DEVICES IN DOCKED ENVIRONMENTS, filed Sep. 26, 2008; is hereby incorporated by references, and discloses a docking station, magnetic coupling arrangement, and an inductive signal interface for use with embodiments such as described by FIG. 5 and FIG. 6.

Figures 7A, 7B:
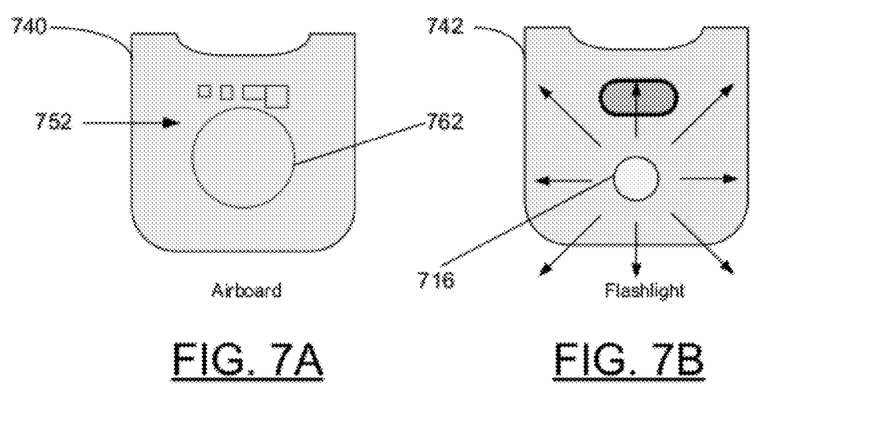
FIG. 7A illustrates a panel segment that includes an inductive signal interface, under an embodiment.
FIG. 7B illustrates an alternative panel segment that includes an illumination component, under an embodiment.

Numerous other usage implementations may be provided with embodiments described herein. In some embodiments, the device connector 132 (FIG. 1) and computing device 110 (FIG. 1) are configured to receive different types of panel segments 140. For example, according to an embodiment, the user may swap one panel segment 140 out for another in order to change the functionality provided. In FIG. 7A, a panel segment 740 includes an inductive signal interface 752 (as described with some other embodiments), which may provide for one or more coils 762 to be provided just under an exterior surface of the panel segment. As described with some other embodiments, the inductive signal interface 752 may be used to receive or transmit power and/or data.

In FIG. 7B, an alternative panel segment 742 includes an illumination component 716, which enables flashlight functionality to be incorporated into a computing device. In such an embodiment, the device 110 (FIG. 1) supplies power to the panel segment 742 across the electrical connection 135 (FIG. 1) to illuminate the component 716. Control of the component 716 may be carried on board with the segment 742, or through the device 110 (FIG. 1). In the latter case, the device 110 (FIG. 1) transmits command data to the panel segment 742 over the electrical connection formed between the two devices.

Figures 7C, 7D:
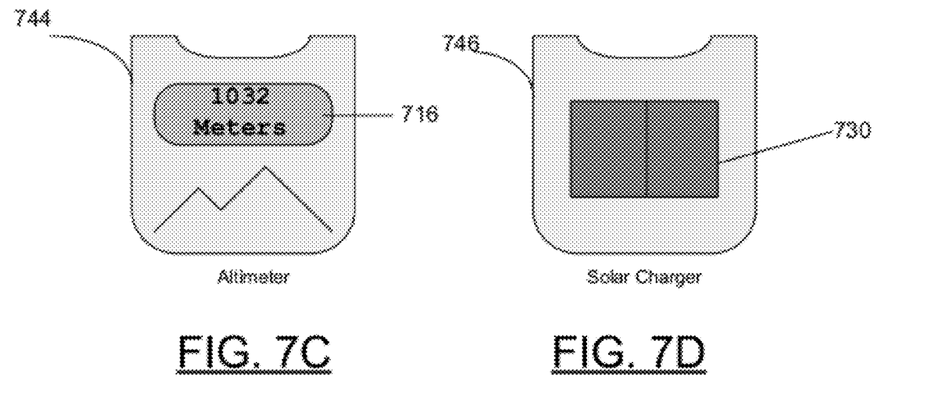
FIG. 7C illustrates another panel segment that is functionalized as an altimeter.
In FIG. 7D illustrates a panel segment that includes a solar charger, under an embodiment.

FIG. 7C illustrates another panel segment 744 that is functionalized as an altimeter. In one variation, the panel segment 744 includes a display component 712 to display an output of the altimeter. The panel segment 744 includes all the logic and sensors required to perform the altimeter function. The device 110(FIG. 1) may connect to the panel segment 744 in order to supply power. However, in some implementations, sensor information and/or calculations/processing required to provide the altimeter output is provided from the processor of the computing device 110 (FIG. 1). Thus, the computing device 110 (FIG. 1) and panel segment 744 can exchange data.

Figure 7E:
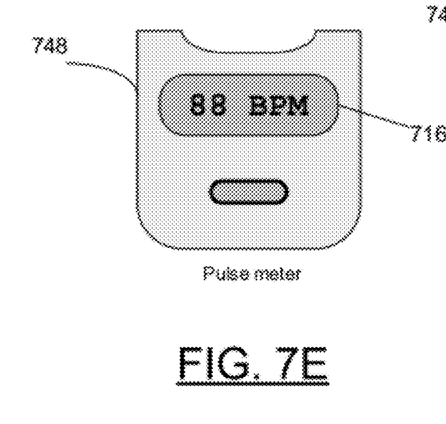
FIG. 7E illustrates a panel segment that includes components for providing a pulse meter with a display component, under an embodiment.

The display component 712 may be utilized with other functionality as well. For example, the panel segment 744 may alternatively provide a clock function, with the display component 712 displaying the time. The display content 712 may also be powered and receive data from the computing device 110 (FIG. 1), and generate and display content that originates from data on the computing device. FIG. 7E also shows another embodiment that implements use of display component 712.

In FIG. 7D, the panel segment 746 includes a solar charger 730. In such an embodiment, the panel segment 140 treats incoming power from the solar cell 730, and signals the power to the device 110 (FIG. 1) across the electrical connection 135 formed by the two devices.

Figure 7F:
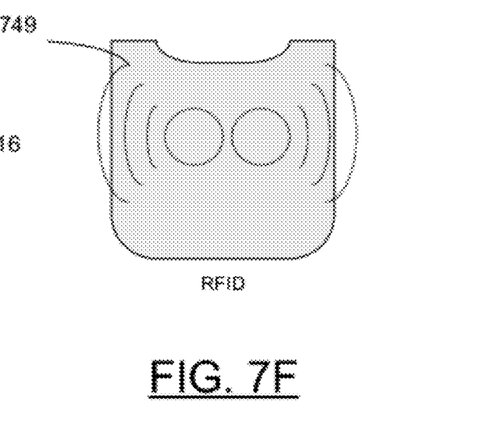
FIG. 7F illustrates a panel segment that includes components for providing a radio-frequency identity device (RFID) communication, under an embodiment.

FIG. 7E illustrates another implementation in which the panel segment 748 includes components for providing a pulse meter with a display component 716. FIG. 7F illustrates an implementation in which the panel segment 749 provides a radio-frequency identity device (RFID) communication. The RFID communication may be used to authenticate the device, or communicate other information that is associated with the device (e.g. serve as a wallet). Each of the implementations shown in FIG. 7E and FIG. 7F may require use of logic and sensors that are either carried on board on the respective panel segments 748, 749, or received or derived from the computing device 110 (FIG. 1). Thus, the panel segments 748, 749 may receive power from the computing device 110 (FIG. 1), and optionally send and receive data in order to perform the functionality of the component.

In still another implementation, panel segment 140 (as described FIG. 1) may lack functionality other than electrical connectivity to provide a data or power pass through. For example, an exterior surface of the panel segment may include electrical connectors that interconnect via pins 441 (see FIG. 4A). Exterior contacts on the panel segment signal power or data as pass through to the computing device via the pins 441

While numerous embodiments are described herein that provide for the panel segment 140 (see FIG. 1) to be separable, removable or detachable from the computing device 110, variations provide for the panel segment to be integrated and not separable from the housing. For example, such an embodiment may provide a panel connector and interior connector to enable the communication of power and data, as described with other embodiments.

It is contemplated for embodiments described herein to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computing device assembly comprising:
   a computing device that contains a plurality of components, including a processor of the computing device;
   a panel segment that is attachable and detachable to the computing device to provide a portion of a housing for the computing device;
   a panel connector positioned on an interior surface of the panel segment;
   a device connector on the computing device positioned to (1) form an electrical connection with the panel connector, and (2) be encased by the panel segment when the panel segment is attached to the computing device; and
   electrical components that are (1) provided with the panel segment, and (2) operable to send or receive an electrical output to or from the one or more components of the computing device, using the electrical connection formed by the panel connector and the device connector;
   wherein the electrical components include an inductive signal interface and a panel processor, wherein the panel processor and the computing device processor are operable to send data to each other; and
   wherein the inductive signal interface is to provide, to another device, power received by the panel segment from a battery module of the computing device via the electrical connection formed by the device connector and the panel connector.

2. The computing device assembly of claim 1, wherein the computing device and the panel segment are configured to (i) operate in a device power input mode in which the computing device is to receive power from the panel segment using the electrical connection formed by the device connector and the panel connector; and (ii) operate in a device power output mode in which the computing device is to send power to the panel segment using the electrical connection formed by the device connector and the panel connector.

3. The computing device assembly of claim 2, wherein the panel segment is configured to provide, to the computing device via the electrical connection formed by the panel connector and the device connector, power received from a power supply device with the inductive signal interface in the device power input mode.

4. The computing device assembly of claim 1, wherein the panel segment further comprises magnetically attractive material to enable the panel, when attached to the computing device, to magnetically couple to another device.

5. The computing device assembly of claim 1, wherein the panel segment includes a display provided on an exterior surface of the panel segment, and wherein the panel segment is to receive at least one of power or data from the computing device across the electrical connection formed by the panel connector and the device connector, in order to operate the display.

6. The computing device assembly of claim 1, wherein the computing device processor is operable to send to the panel processor information regarding at least one of a power level of the computing device, power requirements of the computing device, and power requirements of the battery module.

7. The computing device assembly of claim 1, wherein the computing device is a computer telephony device.

8. The computing device assembly of claim 7, wherein the panel segment is to form a battery cover to overlay the battery module of the computing device when the panel segment is attached to the computing device such that the electrical connection is formed by the panel connector and the device connector.

9. The computing device assembly of claim 8, wherein the computing device is a cellular phone.

10. The computing device assembly of claim 8, wherein the computing device is a smart phone.

11. An accessory device for a computing device, the accessory device comprising:
a panel segment that is removable and re-attachable to the computing device to provide a portion of a housing for the computing device; and
a panel connector positioned on an interior surface of the panel segment to electrically mate and form an electrical connection with a device connector of the computing device when the computing device and the accessory device are attached;
wherein the panel segment includes components to signal power to and/or receive power from the computing device across the electrical connection formed by the device connector and the panel connector, the components including an inductive signal interface and a panel processor;
wherein the panel processor and a processor of the computing device are operable to send data to each other; and
wherein the inductive signal interface is to provide, to another device, power received by the panel segment from a battery module of the computing device via the electrical connection formed by the device connector and the panel connector.

12. The accessory device of claim 11, wherein the inductive signal interface is operable to receive power from the another device, and provide the received power to the computing device across the electrical connection formed by the panel connector and the device connector.

13. The accessory device of claim 11, wherein one or more of the components of the panel segment are to signal sufficient power to the computing device to recharge a battery module of the computing device.

14. The accessory device of claim 11, wherein one or more of the components of the panel segment are to receive data from the computing device, wherein said data indicates power consumption or power requirements of the computing device.

15. The accessory device of claim 11, further comprising magnetically attractive material to enable the panel segment to attach to the another device when connected to the computing device.

16. The accessory device of claim 11, wherein the computing device is a computer telephony device.

17. The accessory device of claim 16, wherein the panel segment is to form a battery cover to overlay the battery module of the computing device when the panel segment is attached to the computing device such that the electrical connection is formed by the panel connector and the device connector.

* * * * *